United States Patent

Moss

[15] 3,642,368
[45] Feb. 15, 1972

[54] CYLINDRICAL EXPOSURE DEVICE FOR TRANSFERRING AN IMAGE OF A MASTER SHEET TO A COPY MEMBER

[72] Inventor: Mortimer Moss, 133-01 Booth Memorial Ave., Flushing, N.Y. 11355

[22] Filed: Sept. 24, 1970

[21] Appl. No.: 74,971

[52] U.S. Cl................................................355/47, 355/49
[51] Int. Cl.......................................................G03b 27/58
[58] Field of Search....................355/85, 104, 108, 109, 110, 355/47–50

[56] References Cited

UNITED STATES PATENTS

| | | | |
|---|---|---|---|
| 1,814,525 | 7/1931 | Owens | 355/48 |
| 1,855,370 | 4/1932 | Trenor | 355/47 |
| 1,993,085 | 3/1935 | Carpenter et al. | 355/48 X |
| 3,215,054 | 11/1965 | Hamilton | 355/109 X |

*Primary Examiner*—Samuel S. Matthews
*Assistant Examiner*—Richard M. Sheer
*Attorney*—Polachek & Saulsbury

[57] ABSTRACT

A device for optically transferring a graphic image from a master sheet to a copy member includes a transparent cylindrical drum. An opaque cylinder is rotatably mounted inside the drum and has diametrically opposed slots at ends of an optical path including mirrors and a lens system inside the cylinder. A slight shielding partition separates ends of the optical path. Lamps in the cylinder at one slot illuminate the master sheet on the drum. Suction can be applied to the master sheet and copy member to hold it on the drum. A blower can ventilate the cylinder. The blower and lamps are energized via sliprings and brushes in bearing sleeves at one end of the drum and cylinder.

10 Claims, 5 Drawing Figures

INVENTOR.
MORTIMER MOSS

INVENTOR.
MORTIMER MOSS

CYLINDRICAL EXPOSURE DEVICE FOR TRANSFERRING AN IMAGE OF A MASTER SHEET TO A COPY MEMBER

This invention concerns a cylindrical optical exposure device useful in duplicating, offset printing, photographic printing, xerographic copying, etc.

Cylindrical devices heretofore known for use in optically transferring an image of an original sheet to a copy member have been large, complex structures which required auxiliary external lenses, mirrors, and the like.

The present invention is directed at providing a compact cylindrical device which can accomplish optical image transfer between master and copy sheets more conveniently and controllably and which is useful in a variety of different processes involving duplicating, printing, copying photographing, electrostatic image transfer, and the like.

According to the invention, a master sheet or original graphic sheet to be copied or photographed is mounted on a transparent, cylindrical drum. A copy sheet to which an image is to be transferred is also mounted on the drum in diametrically opposite position. An opaque cylinder provided with diametrically opposed openings is coaxially and concentrically disposed inside the drum. The cylinder is rotatable with respect to the drum. Lamps, a lens system, mirrors and light shields are arranged inside the cylinder to define an illuminated path from the master sheet to the copy sheet. The master sheet can be transparent and illuminated by external lamps. They copy sheet can be transparent with one or both sides half-silvered to form semimirrors for use as a xerographic or electrostatic plate. Alternatively, a removable strippable sensitized film or film coating can be applied to the drum to serve as a copy member. The device can be arranged so that the drum rotates with respect to the inner cylinder or both drum and cylinder can rotate with respect to each other.

A principal object of the invention is to provide a cylindrical rotary device for optically transferring an image of an original sheet on to a copy member, both original sheet and copy member being mounted on a transparent drum.

A further object is to provide a rotary device as described, with a rotatable opaque cylinder inside the drum provided with openings for progressively exposing parts of the original sheet to a lens inside the cylinder.

Another object is to provide a rotary device as described wherein illuminating means for the original sheet may be inside or outside the rotatable cylinder.

Other and further features, objects and advantages of the invention will become apparent from the following detailed description taken together with the drawings, wherein.

Figure 1:
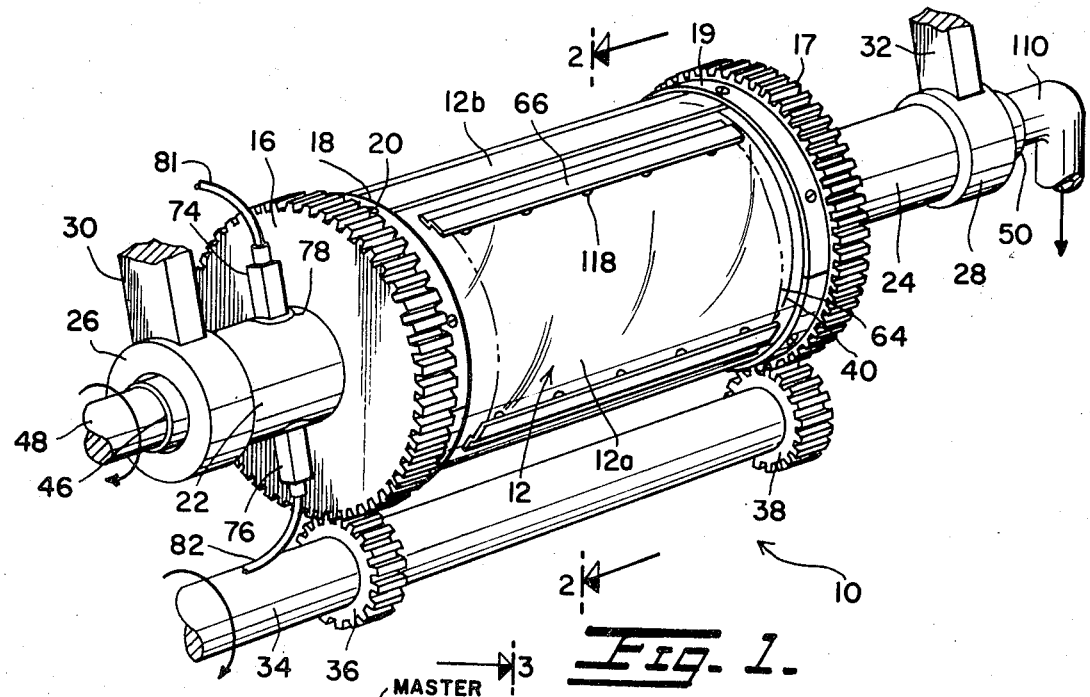
FIG. 1 is a perspective view of a rotary optical, cylindrical, image transfer device embodying the invention.
Figure 2:
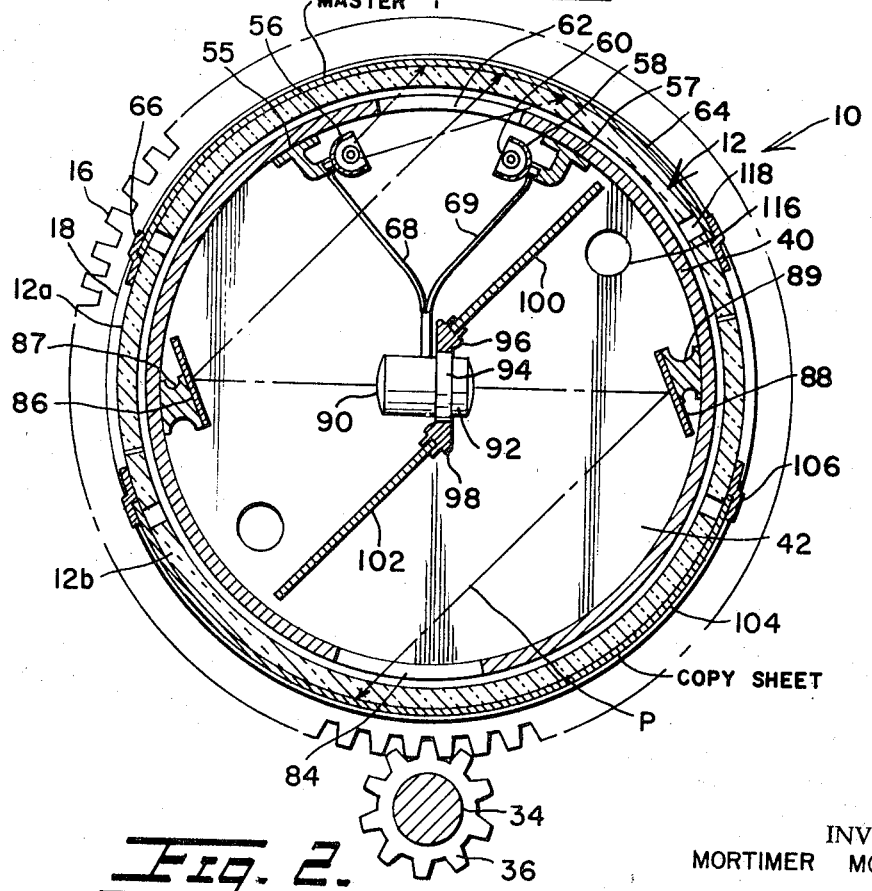
FIG. 2 is an enlarged vertical cross-sectional view taken on line 2—2 of FIG. 1.
Figure 3:
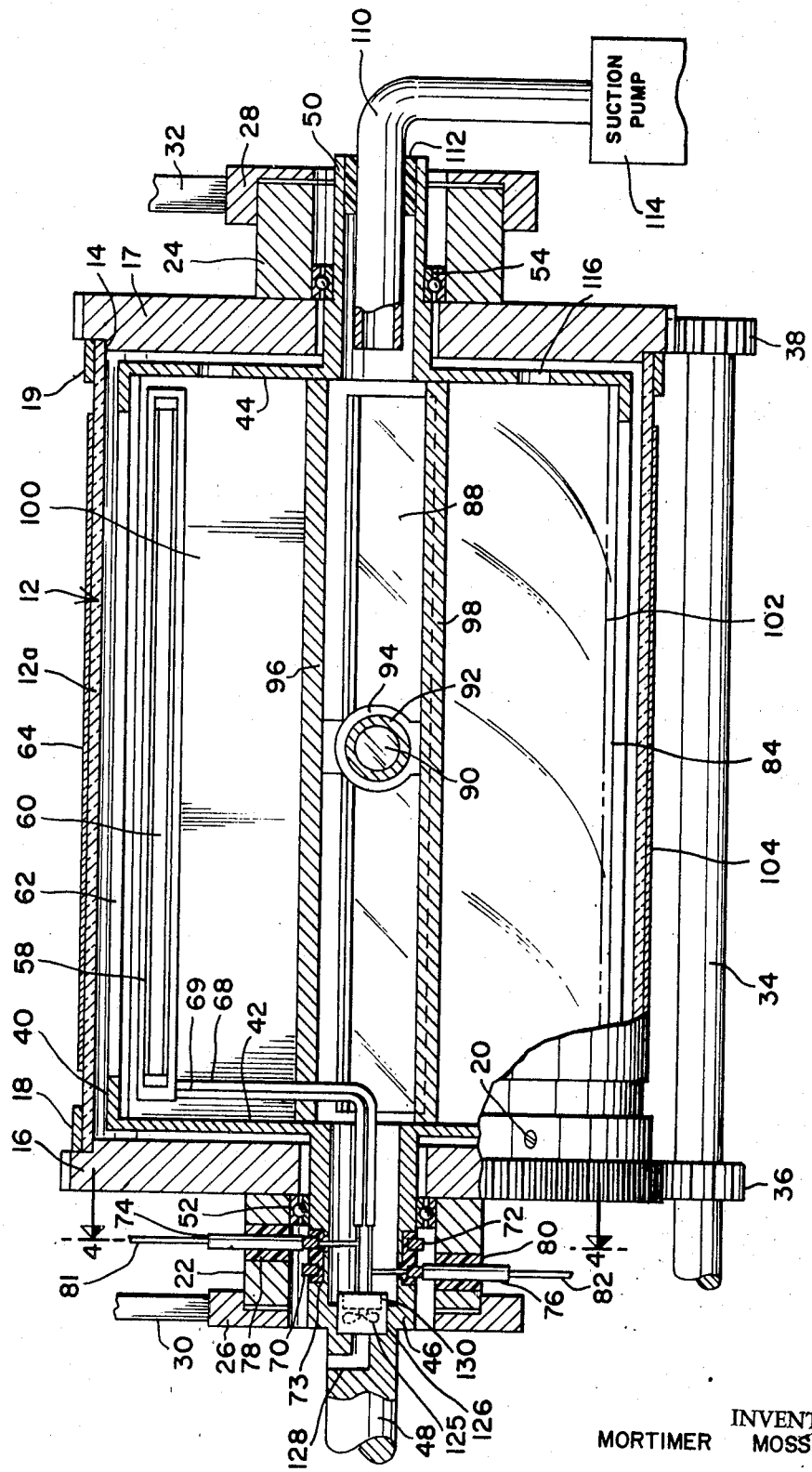
FIG. 3 is a longitudinal sectional view taken on line 3—3 of FIG. 2.
Figure 4:
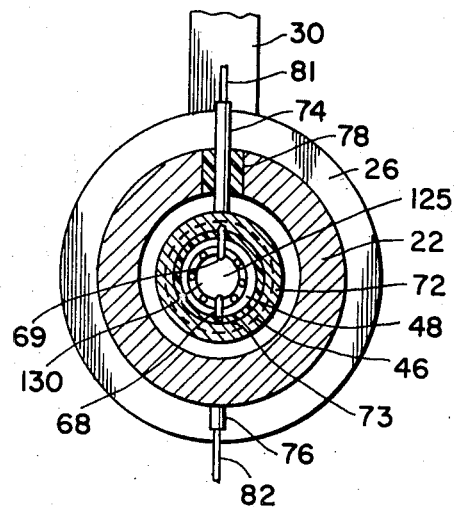
FIG. 4 is a cross-sectional view taken on line 4—4 of FIG. 3.

Referring first to FIGS. 1–4 of the drawings, there is shown a device 10 embodying the invention. The device includes a transparent cylindrical drum 12 having two rigid cylindrical half sections 12, 12b mounted on inner ledges 14 of two axially parallel spur gears 16, 17. Radially split flexible bands 18, 19 secured by screws 20 at ends of half sections hold the two half sections together to form the drum. Removal of the bands permits disassembly of the drum for internal cleaning and servicing. The sections of the drum are made of glass or transparent plastic material. Secured to the gears 18, 19 are cylindrical sleeve shafts 22, 24 journaled in stationary cup bearings 26, 28 at opposite ends of the device. The bearings 26, 28 are supported by stationary radial posts or bars 30, 32. A drive shaft 34 disposed axially parallel to drum 12 has spaced spur gears 36, 38 meshed with gears 16, 17. The shaft 34 can be held stationary. It can also be rotated manually or by any external drive means for turning the drum.

Coaxial with and concentrically disposed inside drum 12 is an opaque metal or plastic cylinder 40 closed by circular end plates 42 and 44 secured thereto. End plate 42 has an axial sleeve shaft 46 at the outer end of which is secured a drive shaft 48 for turning the cylinder circumferentially. Plate 44 has an axial sleeve shaft 50. Ball bearing races 52, 54 are interposed between the sleeve shafts 22, 46 and 24, 50. The inner cylinder is thus journaled to rotate inside the drum, or the drum can rotate with respect to the cylinder, or either can rotate with respect to the other.

Mounted by brackets 55, 57 inside the cylinder are two elongated lamp fixtures 56, 58. The fixtures carry elongated illuminating lamps 60, and transformers (not shown). The lamps are disposed at opposite edges of an elongated slot or opening 62 formed in the opaque cylinder 40. The lamps are oriented to illuminate a master sheet 64, which can be mounted on the drum. Margins of the sheet are engaged by elongated clips 66 extending longitudinally on the drum. The lamps are energized by wires 68 and 69 connected to transformers and sockets in the lamp fixtures. The wires terminate at sliprings 70, 72 engaged in insulated ring 73 on sleeve shaft 46. The sliprings are wiped by conductive brushes 74, 76 carried by insulated bushings 78, 80 set in sleeve shaft 22. Wires 81, 82 are connected from the brushes to an external power supply. These wires are flexible to permit limited angular rotation of the drum in cup bearings 26, 28.

Another elongated longitudinally extending slot or opening 84 is formed in cylinder 40 diametrically opposite from slot 62. Elongated mirrors 86, 88 are mounted by brackets 87, 89 inside the cylinder so as to define an optical path P from opening 62 to opening 84 via a lens system 90 mounted in a lens barrel 92 and supported in a ring frame 94. Barrel 92 extends axially, diametrically of cylinder 40. Frame 94 is integral with two channel bars 96, 98 which engage inner edges of opaque plates 100, 102. These plates extend axially of the cylinder and serve as light shields or partitions between opposite ends of light path P, between opposite ends of the lens system, between the mirrors, between the openings 62, 84, and between master sheet 64 and copy member 104. Ends of the plates 100, 102 can be welded or otherwise secured to end plates 42, 44 of the cylinder. The copy sheet or copy member 104 can be mounted by further longitudinally extending clips 106 on drum 12. The master sheet 64 and copy member will be in diametrically opposite positions.

A suction pipe 110 can be fitted axially in the end of sleeve shaft 50. A sealing and bearing ring 112 is fitted between pipe 110 and sleeve shaft 50. Suction can be applied to the inside of the cylinder from a suitable suction pump 114. Holes 116 are provided in end plates 42, 44 and further holes 118 are provided in the drum at clips 66 and 106 so that the suction can be applied to edges of the master and copy sheets to hold them securely to the drum. If desired hinged doors (not shown) can be provided in cylinder 40 to provide access to interior parts when drum sections 12a, 12b are removed. A blower 125 can be mounted in a cavity 126 in the inner end of shaft 48; see FIG. 3. The blower will open into the cylinder 40 to ventilate it by a forced air draft. An air inlet passage 128 can be provided in shaft 48. Holes 118 in the drum will serve as air outlets. Also the suction pipe 110 can be removed so that sleeve shaft 50 serves an an air outlet. Wires 68, 69 are connected to blower motor 130.

The device described can be used in a variety of ways. In one way for use in offset printing, an original or master sheet 64 will be attached to the outside of drum 12 facing downwardly or inwardly to cylinder 40. A light sensitized transparent plate will serve as copy member 104. This plate will be attached to the drum face outwardly diametrically opposite from the master sheet. The drum 12 will be held stationary while the inside cylinder 40 is rotated with lamps illuminated. Cylinder 40 will be turned circumferentially through the cylindrical angle defined by master sheet 64 on the drum. Exposure will be made on optical path P via the openings 62, 84, mirrors 86, 88 and lens system 90, as indicated by dotted lines in FIG. 2. After exposure is completed, the plate 104 will be removed and developed or otherwise processed for printing.

If the original master is a board which cannot be bent to curved shape, it is possible to hold both the drum and cylinder stationary while the board is moved tangentially of the drum at opening 62. A light shielding blanket can be provided over the board while it is exposed at opening 62.

Figure 5:
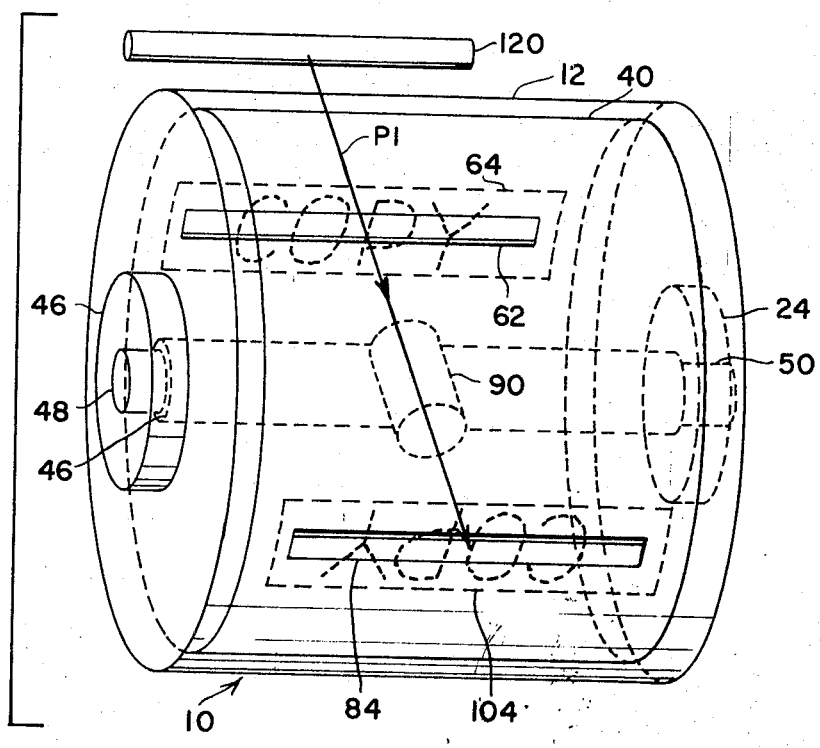
FIG. 5 is a simplified diagram illustrating a mode of operation of the device by external illumination means.

FIG. 5 shows the device 10 diagrammatically used with external illumination means such as an elongated lamp 120. Lamps 60 will be turned off. Either the drum 12 or inner cylinder 40 can be turned angularly a distance equal to the circumferential angle defined by master sheet 64. The optical path P' will be a straight line or plane from lamp 120 through slot 62, lens system 90 and slot 84 to copy member 104.

In order to simplify the drawings suitable associated conventional auxiliary equipments have been omitted. The will include exposure timing devices, drum and cylinder drive means, clutch devices, switches and the like.

Although a preferred embodiment of the invention has been described and illustrated, it will be understood that this has been by way of example only, and that many modifications and variations are possible without departing from the invention as claimed.

What is claimed is:

1. A device for optically transferring a graphic image from a master sheet to a copy member, comprising a transparent cylindrical drum; an opaque hollow cylinder disposed coaxially and concentrically inside the drum; bearing means at ends of the cylinder rotatably supporting the cylinder to rotate inside the drum, said cylinder having diametrically opposed elongated slots therein to define ends of an optical path between a master sheet and copy member when applied to said drum at diametrically opposed positions thereon; and an optical system disposed in said optical path inside the cylinder, said optical system being mounted on the inner surface of said cylinder for rotation therewith.

2. A device as defined in claim 1, further comprising partition means defining a light shield in said cylinder between opposite ends of said optical path.

3. A device as defined in claim 2, further comprising mirrors disposed in said optical path inside the cylinder; and lamp means disposed in said cylinder at one of said slots to illuminate the master sheet there at.

4. A device as defined in claim 1, further comprising suction maintaining means connected to one end of the cylinder at said bearing means, said cylinder and drum having openings providing direct communication between said master sheet and suction means to retain the master sheet on the drum by suction.

5. A device as defined in claim 3, further comprising sliprings and brushes at said bearing means for connecting said lamp means to an external source of power.

6. A device as defined in claim 5, further comprising air blower means at one end of the cylinder providing forced air ventilation in the cylinder, said air blower means being electrically connected to said sliprings and brushes for energization by said source of external source of power.

7. A device as defined in claim 1, further comprising other bearing means rotatably supporting said drum so that the drum is rotatable independently of the cylinder.

8. A device as defined in claim 6, further comprising suction maintaining means connected to one end of the cylinder at said bearing means, said cylinder and drum having openings providing direct communication between said master sheet and suction means to retain the master sheet on the drum, by suction.

9. A device as defined in claim 8, further comprising other bearing means rotatably supporting said drum so that the drum is rotatable independently of the cylinder, said sliprings and brushes being mounted in the first named and other bearing means at the other end of said cylinder.

10. A device as defined in claim 1, wherein said drum comprises a pair of semicylindrical sections; circular end members engaging opposite ends of said semicylindrical sections; disengageable fastener means holding said sections of the drum on said end members; and mechanical engagement elements on said drum for receiving and holding edges of said master sheet and copy member on the drum.

* * * * *